Dec. 11, 1951  L. EK ET AL  2,578,466
UNDERSLUNG TIRE CARRYING FRAME
Filed Jan. 18, 1950  2 SHEETS—SHEET 1
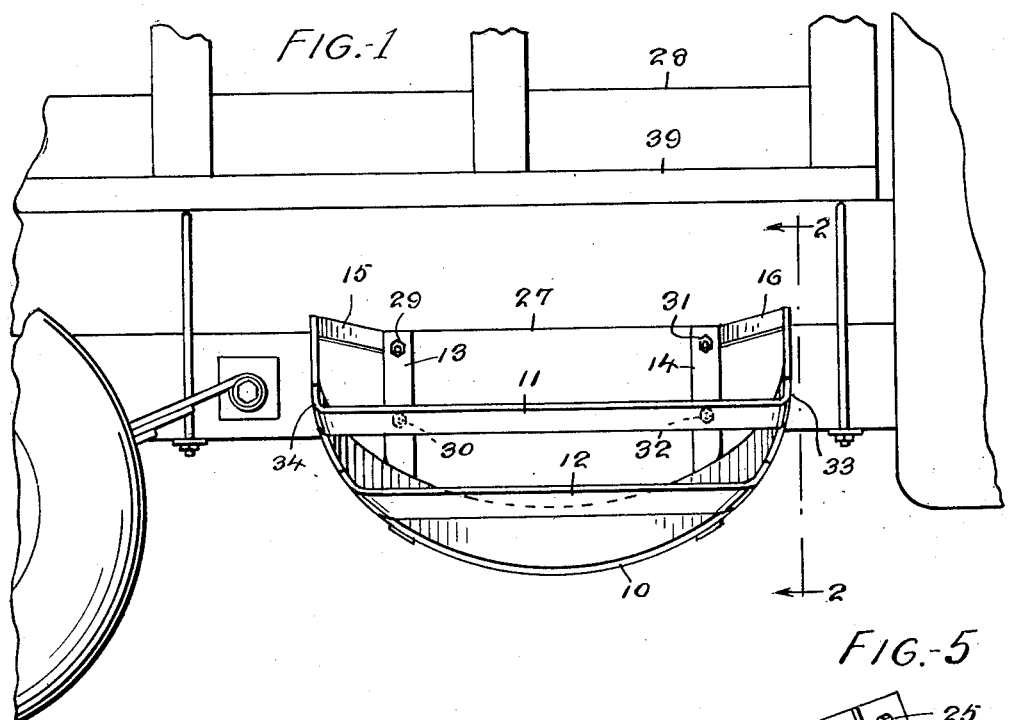
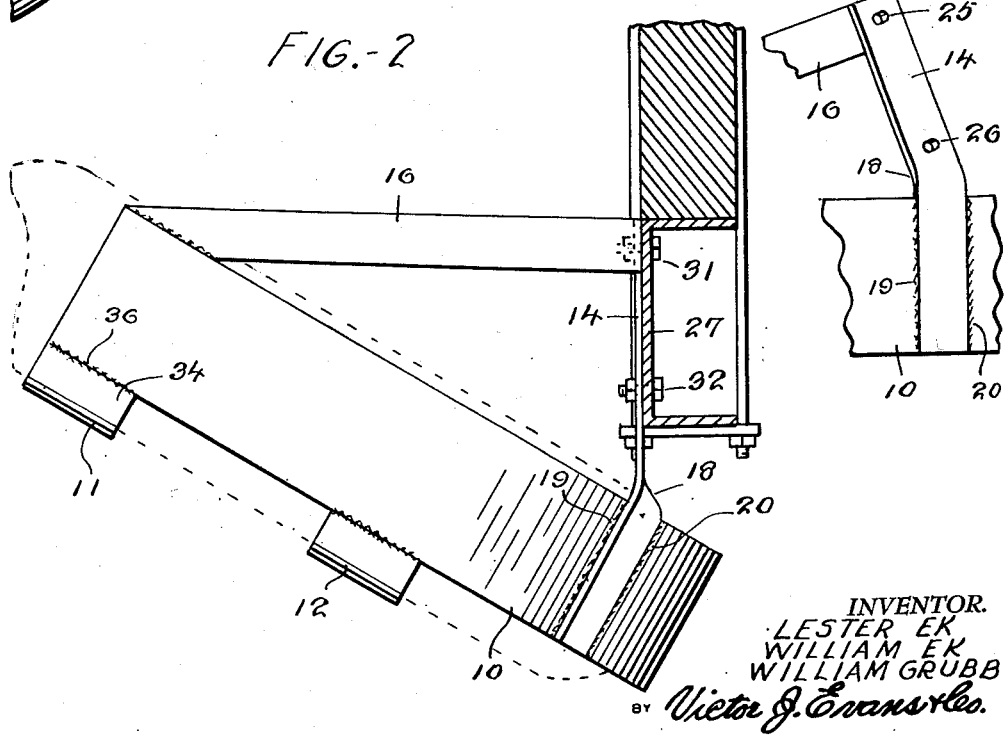
INVENTOR.
LESTER EK
WILLIAM EK
WILLIAM GRUBB
BY Victor J. Evans & Co.
ATTORNEYS Dec. 11, 1951
L. EK ET AL
2,578,466
UNDERSLUNG TIRE CARRYING FRAME
Filed Jan. 18, 1950
2 SHEETS—SHEET 2
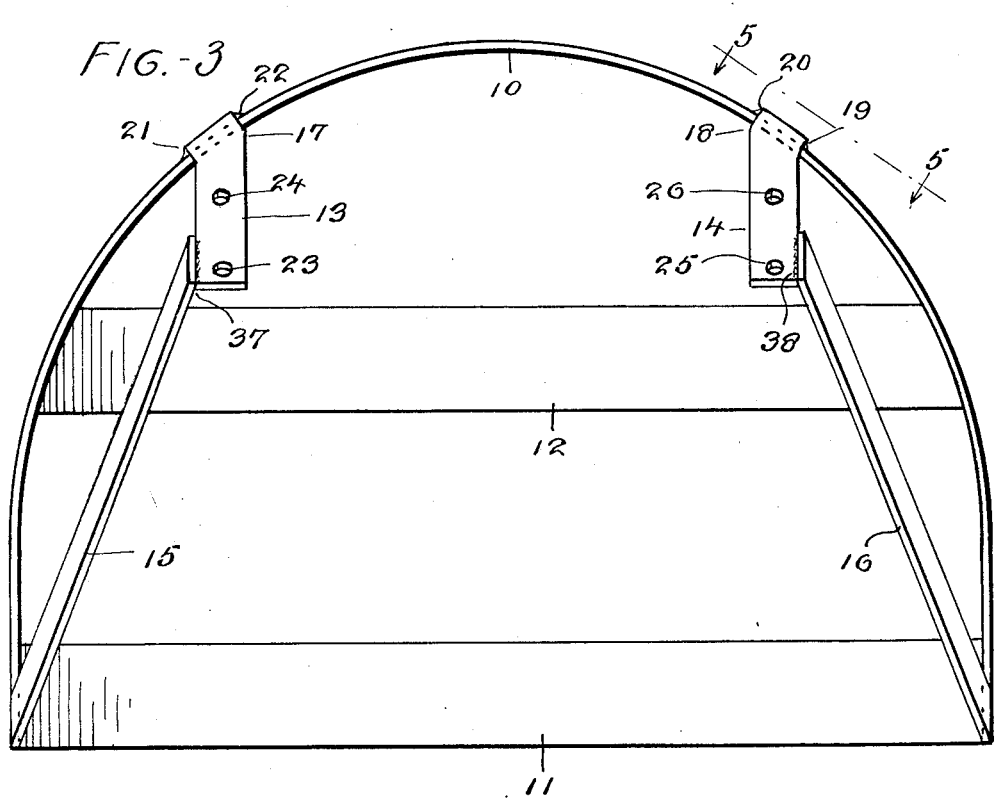
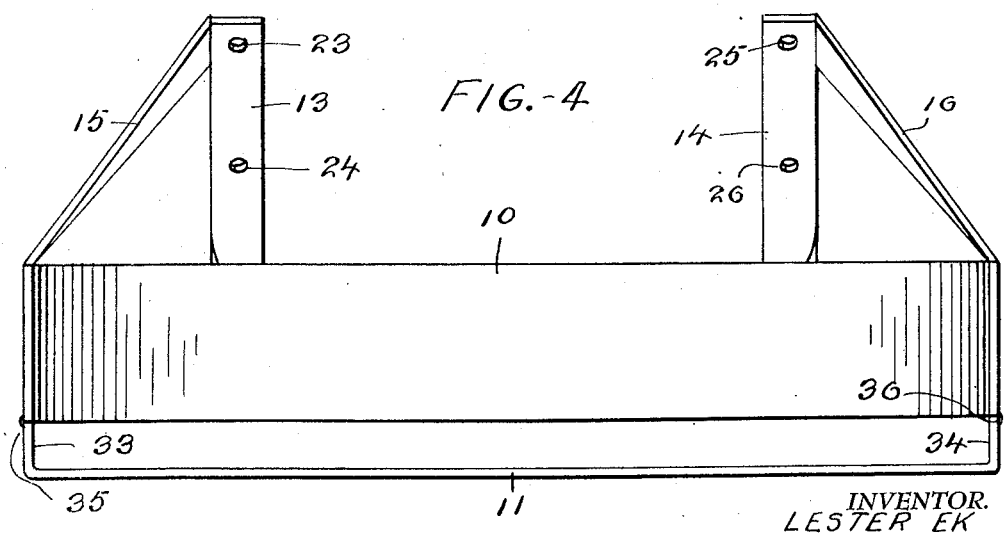
INVENTOR.
LESTER EK
WILLIAM EK
WILLIAM GRUBB
BY Victor J. Evans & Co.
ATTORNEYS Patented Dec. 11, 1951

2,578,466

UNITED STATES PATENT OFFICE 2,578,466

UNDERSLUNG TIRE CARRYING FRAME

Lester Ek, William Ek, and William Grubb, Conrad, Mont.

Application January 18, 1950, Serial No. 139,166

1 Claim. (Cl. 224—42.23)

This invention relates to tire carriers of motor vehicles, and in particular a tire carrying frame mounted on the side of a truck chassis and positioned in an inclined position between the rear wheels and cab of the truck.

The purpose of this invention is to provide a tire carrier that utilizes space under the side of a truck chassis and in front of the rear wheels and in which the carrier is freely positioned so that a tire may be removed therefrom and replaced therein without removing nuts or bolts and without the use of tools.

Motor vehicle tire and wheel carriers have been positioned at various points on the chassis and in trunks but in the usual type of carrier it is difficult to remove and replace a tire and where the tires are horizontally positioned it is necessary to use bolts or clamps for retaining the tires in the carriers. With this thought in mind this invention contemplates a frame secured to the side of the chassis of a motor vehicle with a tire retaining section thereof suspended in an inclined position whereby a tire or wheel is retained therein by gravity.

The object of this invention is, therefore, to provide means for supporting a tire carrying frame in an inclined position from a side beam of the chassis of a truck whereby a tire may readily be inserted therein and removed therefrom and in which the tire is retained in the frame by gravity.

Another object of the invention is to provide a tire carrying frame for motor vehicles that may readily be installed on vehicles now in use without changing the parts thereof.

A further object of the invention is to provide a tire carrying frame for motor vehicles which is of a simple and economical construction.

Other features and advantages of the invention will appear from the following description taken in connection with the drawings wherein:

Figure 1 is a side elevational view showing the intermediate portion of a truck with the end parts broken away and with the tire carrying frame of this invention bolted to a side beam of the chassis thereof.

Figure 2 is a cross section taken on line 2—2 of Figure 1 showing an end elevation of the tire carrying frame with the side beam of the vehicle chassis shown in section.

Figure 3 is a plan view of the tire carrying frame showing the frame detached from the vehicle.

Figure 4 is a front elevational view of the tire carrying frame also showing the frame detached from the vehicle.

Figure 5 is a detail illustrating one of the frame supporting hangers being taken on line 5—5 of Figure 3.

Referring now to the drawings wherein like reference characters denote corresponding parts the tire carrying frame of this invention includes a substantially semicircular band 10, with an upper bar 11 extended across the outer ends of the band and positioned on the lower edge thereof, an intermediate bar 12 connecting the intermediate part of the band and also extended across the lower edge thereof, upwardly extended hangers 13 and 14, and braces 15 and 16 connecting the upper ends of the hangers to the upper edges of the ends of the band 10.

As illustrated in the drawings the hangers 13 and 14 are twisted at the points 17 and 18 and extended slightly inward as illustrated in Figures 2 and 5 with the lower ends secured, preferably by welding to the outer surface of the band 10, as shown in Figure 2 with the hanger 14 welded to the band at the points 19 and 20 and with the hanger 13 welded to the band at the points 21 and 22.

The hanger 13 is provided with bolt holes 23 and 24 and the hanger 14 is provided with similar bolt holes 25 and 26. The frame is mounted on a side beam 27 of a truck 28 by bolts 29 and 30 extended through the bolt holes of the hanger 13, and 31 and 32 extended through the bolt holes of the hanger 14.

The bars 11 and 12 are provided with upwardly extended ends, as illustrated in Figures 2 and 4 and the ends 33 and 34 of the outer bar 11 are welded to the edge of the band 10 at the points 35 and 36. The ends of the bar 12 are formed in a similar manner and the ends of this bar are also welded to the lower edge of the band 10, similar to the ends of the bar 11. The end of the brace 15 is welded to the edge of the hanger 13 at the point 37 and the end of the brace 16 is welded to the upper end of the hanger 14 at the point 38, as shown in Figure 3.

With the parts formed in this manner the tire carrier of this invention is bolted to the side beam of the truck chassis with the tire carrying section of the frame suspended in an inclined position whereby a tire may readily be inserted in the frame and also readily removed therefrom.

The edges of the platform 39 of the truck body extend outwardly beyond the side beams 27 and with the carrier mounted on the beams the tire is positioned under the edge of the platform so that it is in an out of the way position.

It will be understood that modifications may be made in the design and arrangement of the parts without departing from the spirit of the invention.

What is claimed is:

In a motor vehicle tire carrier, the combination which comprises a substantially semicircular band, a bar connecting the outer ends of the band with the ends thereof secured to the lower edge of the band and extended downwardly therefrom, an intermediate bar also extended downwardly from the lower edge of the band and positioned across the intermediate part of the band, spaced hangers secured to the outer surface of the band and extended vertically upward, and braces extended from the upper ends of the hangers to the outer ends of the band, respectively, and secured to the upper edge of the band, and means attaching the hangers to a side beam of a motor vehicle chassis, with the frame suspended in an inclined position between the rear wheels and cab of the vehicle.

LESTER EK.
WILLIAM EK.
WILLIAM GRUBB.

REFERENCES CITED

The following references are of record in the file of this patent:

UNITED STATES PATENTS

| Number | Name | Date |
|---|---|---|
| 1,253,339 | Bertman | Jan. 15, 1918 |
| 1,327,097 | Johnson | Jan. 6, 1920 |
| 1,338,630 | Horracks | Apr. 27, 1920 |
| 1,343,964 | Dunstan | June 22, 1920 |
| 1,602,916 | Lynn | Oct. 12, 1926 |
| 2,355,980 | Kosky et al. | Aug. 15, 1944 |
| 2,377,149 | Heil | May 29, 1945 |